(12) United States Patent
Scarano

(10) Patent No.: US 6,712,964 B2
(45) Date of Patent: Mar. 30, 2004

(54) METHOD OF FASTENING FILTER MEDIA TO FLAT CIRCULAR SUPPORT STRUCTURE

(75) Inventor: Robert V. Scarano, Queensbury, NY (US)

(73) Assignee: Kadant Inc., Waltham, MA (US)

(*) Notice: Subject to any disclaimer, the term of this patent is extended or adjusted under 35 U.S.C. 154(b) by 236 days.

(21) Appl. No.: 10/001,141

(22) Filed: Nov. 15, 2001

(65) Prior Publication Data

US 2003/0089653 A1 May 15, 2003

(51) Int. Cl.⁷ .................. B01D 29/25; B01D 29/37; B07B 1/06; B07B 1/48
(52) U.S. Cl. ............... 210/232; 210/497.3; 209/403
(58) Field of Search ............ 210/232, 497.3; 209/403

(56) References Cited

U.S. PATENT DOCUMENTS

| 973,149 | A | * | 10/1910 | Warner |
| 3,341,013 | A | * | 9/1967 | Moulton |
| 3,352,418 | A | * | 11/1967 | Swallow |
| 4,028,230 | A | * | 6/1977 | Rosemblum |

* cited by examiner

Primary Examiner—Thomas M. Lithgow
(74) Attorney, Agent, or Firm—Frommer Lawrence & Haug LLP; Ronald R. Santucci

(57) ABSTRACT

A screen filter device or strainer for separating liquid from solids having a disposable filter media which is easily detached and affixed to a filter support to provide for ease of replacement.

5 Claims, 3 Drawing Sheets

METHOD OF FASTENING FILTER MEDIA TO FLAT CIRCULAR SUPPORT STRUCTURE

FIELD OF THE INVENTION

The present invention relates to an improved screen filter device or strainer which is used in separating a mixture for recovering the solids, cleaning the liquid and/or thickening the liquid.

BACKGROUND OF THE INVENTION

There presently exists in many industries, particularly the papermaking industry, the need to separate solids from liquids. In this regard, filtering of the liquid provides for a convenient way of providing same. Heretofore as set forth in U.S. Pat. No. 3,112,263 a screen filter device is shown where a cleansing spray of liquid is used to clean the screen of the filter of solids and other debris. The liquid is sprayed upward and impinges upon the screen passing therethrough to provide a cleansing effect. Improvements thereon include U.S. Pat. No. 4,412,920, the disclosure of which is incorporated herein by reference, wherein a filtering device is disclosed. This device utilizes a screen having a central opening and a top spray arranged so that the liquid to be filtered flows through the screen. The solids collected are forced along the screen toward a central opening. Thus the separation of the solids from the liquid occurs.

An improvement upon that device is that set forth in U.S. Pat. No. 5,259,955, the disclosure of which is also incorporated herein by reference. In this latter patent, the performance of the strainer is improved significantly through the application of a vacuum under the screen thereby applying an additional force on the liquid being strained to force it through the screen. To prevent stapling, a high pressure cleansing fluid is directed at the screen at the same time at an angle with the nominal plane or surface of the screen to force the solids strained by the screen to roll towards the center opening before the solids become stapled. A further improvement upon the foregoing is that disclosed in U.S. Pat. No. 5,453,193. The device disclosed therein includes two concentric containers, the outer one feeling a solid/liquid mixture to the inner container and the inner container supporting a screen. The mixture flows onto the screen so that the liquid goes through the screen and the solids, assisted by a shower action, roll toward a central opening. To insure that the mixture flows evenly onto the screen, a weir structure is provided.

In many of the strainers, particularly those used in the papermaking industry, a replaceable filter media is used which is maintained on a support structure. Typically the support structure includes a reject opening in the center. See for example U.S. Pat. No. 4,412,920, elements 24 (which is the screen and support structure as one element) and 26.

Replacement of the filter media is a required routine maintenance procedure, since the media after time either becomes too clogged to be efficient or otherwise wears out. This is usually an expensive, difficult and time consuming procedure. Typically, what is involved is removing the old filter media and stretching the new filter media into position and clamping it in place between steel rings. This requires that the strainer be shut down, the filter media removed, disassembled with the new filter media stretched evenly and clamped by way of a multiplicity of fasteners. The reject opening is also clamped and the refitted filter assembly is then placed back in the strainer vessel and reassembled.

Thus it can be appreciated that it would be advantageous to simplify the filter replacement process.

SUMMARY OF THE INVENTION

It is therefore a principal object of the invention to provide for a strainer that overcomes the problems and difficulties in replacing filter media in strainers.

It is further object to provide for a replacement filter media which is readily implemented without requiring disassembly and re-assembly of the strainer.

A yet further object is to provide for a replacement filter media which is easily and accurately tensioned for proper use.

Such objects are achieved by the present invention which is directed to a filter media made of fabric which includes a tensioning member around its circumference so as to evenly tension the media over a support structure. An axially positioned reject opening and skirt is also provided. Such an arrangement may be readily assembled and replaced in the strainer avoiding the disadvantages heretofore encountered.

DETAILED DESCRIPTION OF THE PREFERRED EMBODIMENT

Thus by the present invention, its objects and advantages will be realized the description of which should be taken in conjunction with the drawings wherein.

DETAILED DESCRIPTION OF THE PREFERRED EMBODIMENTS

Figure 2:
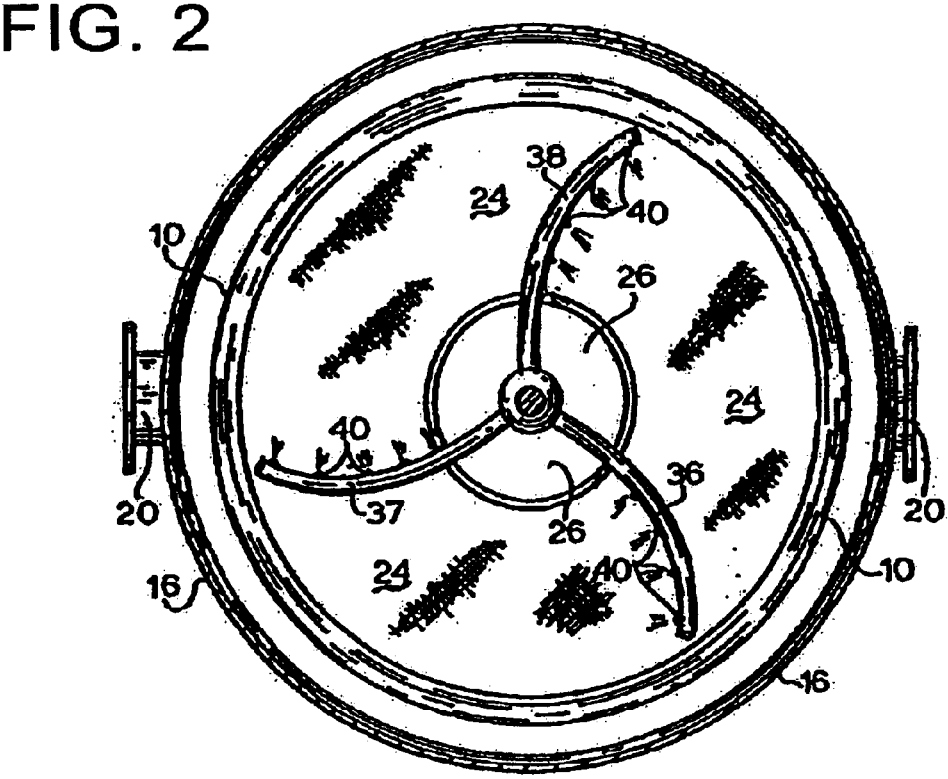
FIG. 2 is a sectional view taken along lines 2—2 of FIG. 1.
Figure 1:
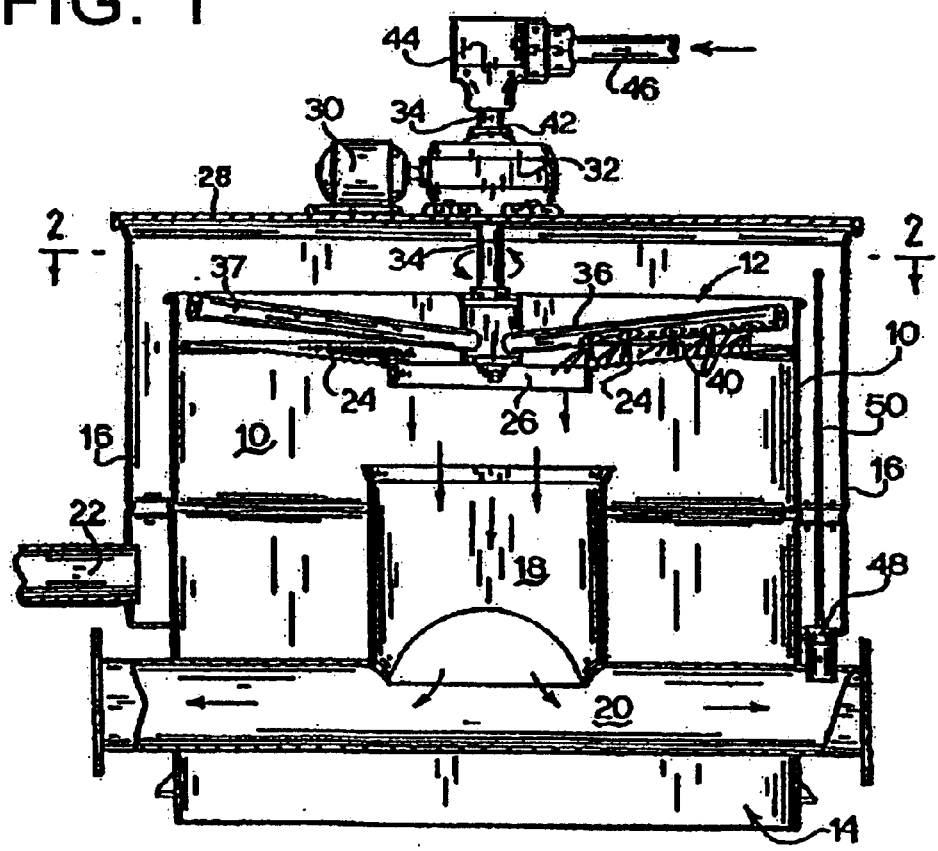
FIG. 1 is a partially sectional plan view of a strainer disclosed in the prior art.

Turning now more particularly to the drawings, FIGS. 1 and 2 depict a strainer disclosed in U.S. Pat. No. 4,412,920, the disclosure of which is incorporated herein by reference.

Such a strainer sets forth a somewhat general configuration of a strainer in which the present invention can be utilized. Accordingly, a brief description of the strainer illustrated therein is included herein.

In this regard, the filter device or strainer shown includes cylindrical container 10 having open top and bottom 12 and 14 respectively concentrically arranged within feed container 16, the side wall thereof extending above container 10. A third container 18, also concentrically arranged is disposed within container 10 with its open top considerably beneath the top of container 10 and its bottom communicating with and arranged to feed into horizontal outlet pipe 20. An inlet pipe 22 is provided for feeding particulate containing liquid into feed container 16. A somewhat horizontal circular screen 24 is fitted at the top of container 10. The screen 24 has an open circular center or reject opening 26 which is disposed above container 18 with its center generally on the line of the vertical axis to container 18. In the screen shown the opening 26 is less in diameter than the diameter of container 18.

A cover 28 is provided for feed container 16. Motor 30 and gear reduction box 32 which are supported by the cover rotate shaft 34 which projects downwardly through the cover. On the end of shaft 34 there are mounted radially disposed spray pipes 36, 37 and 38, each of which is of horizontally arced configuration and supports a series of spray nozzles 40.

In operation the liquid containing particles to be separated is allowed to enter the feed container 16 through inlet 22. This liquid builds up to a height where it overflows the wall of container 10, flows onto screen 24 where the liquid component and fines (particles sufficiently small to pass through the filter screen 24) pass through the screen and into container 10, and therethrough, downwardly by action of gravity and out bottom 14 for collection or recirculation as desired.

The larger particles contained in the liquid to be filtered do not pass through the screen. The liquid from the spray nozzles 40 impinges on the upper surface of the screen as the arms rotate to doctor these large particles from the upper surfaces of the screen and direct them toward the center where they pass through opening 26 and by gravity, and such hydraulic force as is being generated, into container 18 and out thereof through conduit 20 for collection or other disposal.

While in the aforesaid reference a circular screen 24 is shown (which typically is made of metal mesh), in later devices it was found that it was more advantageous to use a coarser mesh as a support for a disposable or replaceable filter media (typically woven polyester). This, as aforesaid, would be positioned on the support and secured about its perimeter between two metal rings the lower one of which supported the metal mesh support, the upper one of which clamped down via tensioning screws to secure the filter media therebetween. Also, it was important that the filter media be properly positioned and tensioned across the support member and properly sealed about its perimeter.

Figure 3:
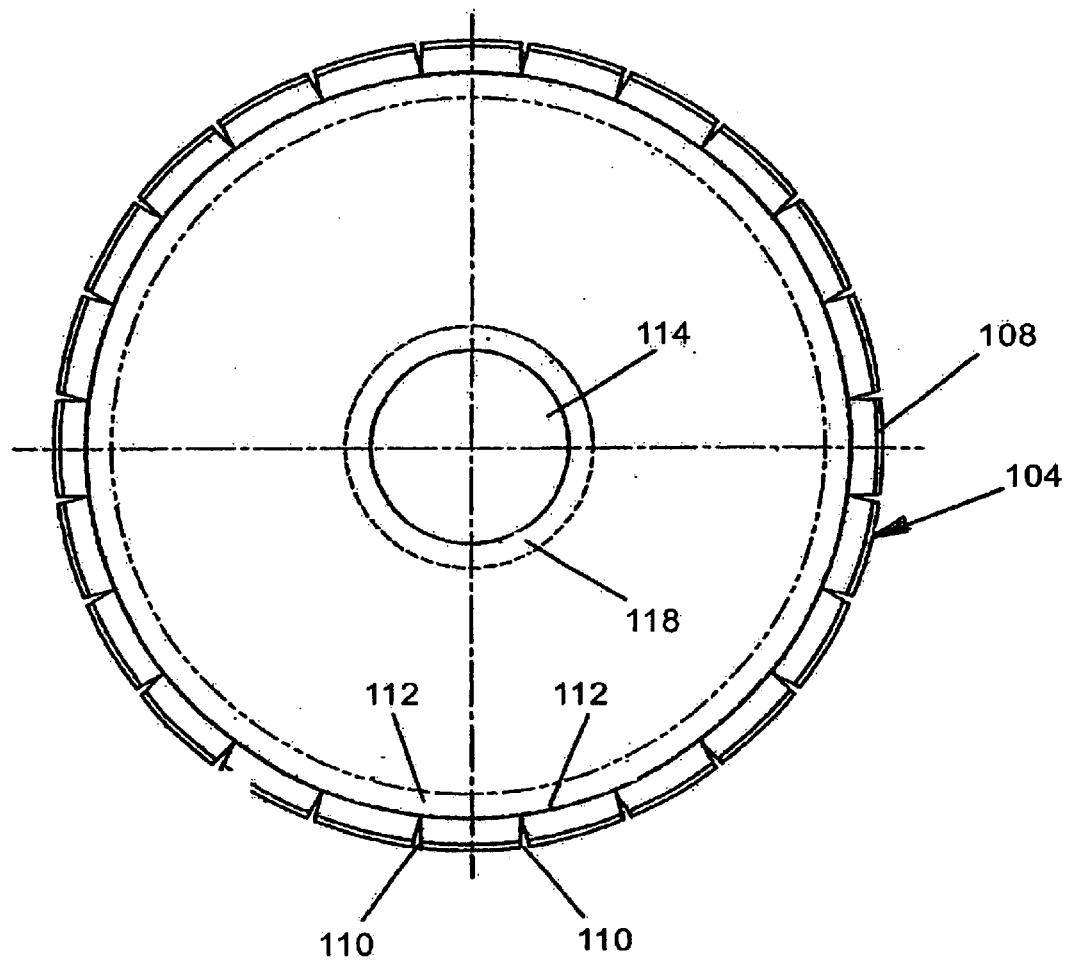
FIG. 3 is a bottom, somewhat plan view of the filter media incorporating the teachings of the present invention.
Figure 5:
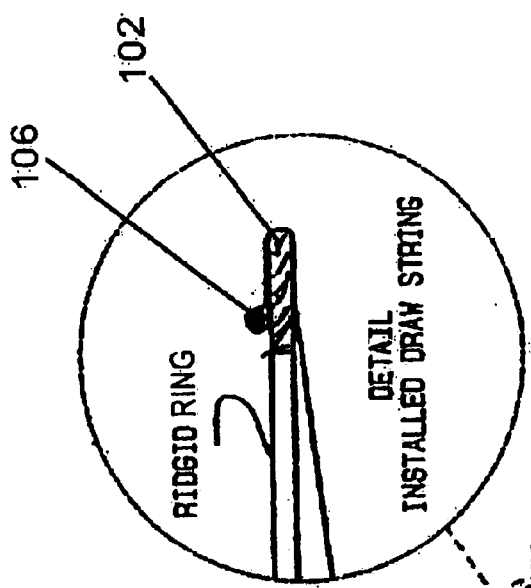
FIG. 5 is an enlarged partial view of the end of the filter media.
Figure 4:
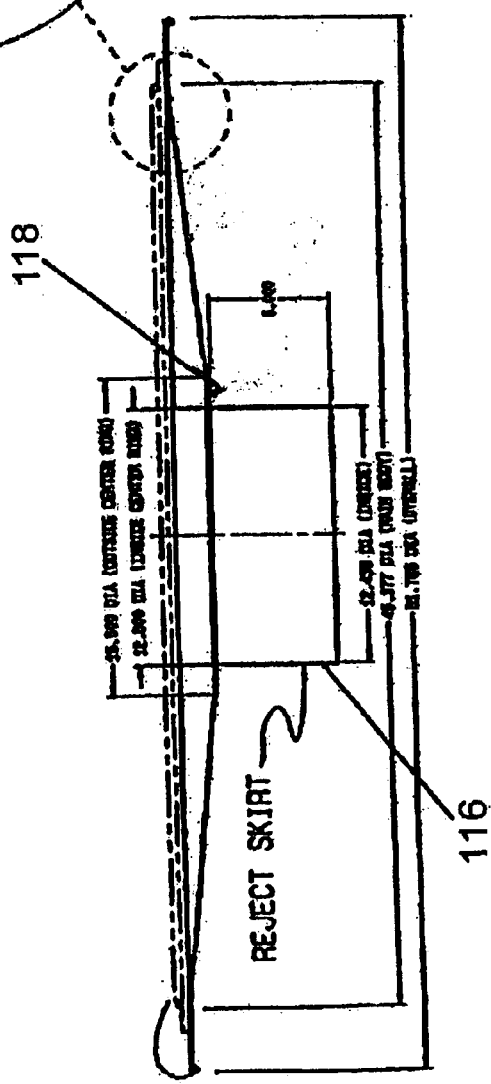
FIG. 4 is a side view of the filter media shown in FIG. 3.

Turning now to FIGS. 3–5, there is shown the filter 100 of the present invention. The filter 100 is typically made out of woven yarns which may be monofilament or multifilament polyester material. Depending upon the particular application (e.g. the fluid being filtered or the degree of filtering required, etc.) it will dictate the material used and the tightness of the weave, among other things.

Once the media is selected, it is formed into a circular shape. The diameter of the filter 100 is larger than that of the top metal ring 102 to which it is affixed so that a certain amount of wrap around is achieved as will be discussed. About the perimeter 104 of filter 100 is a drawstring 106 which is positioned in a sleeve 108 of overlapped material which is stitched in place.

The sleeve 108 for the drawstring 106 and a portion of the filter 100 itself may be darted (v-shaped notches) at locations 110 about the perimeter 104 so as to minimize wrinkling of the filter 100. So as to avoid tearing at notches 110, they should be sufficiently stitched (e.g. tripled stitched) about interior circumferential line 112.

Axially positioned in the filter is a circular reject opening 114. Downwardly depending therefrom is a reject sleeve or skirt 116 which would extend into the reject opening (see element 18 of FIG. 1) which will ensure that rejects are excluded from the filtered fluid in chamber 10. Positioned about reject opening 114 is a rigid inner ring 118 which may be stitched onto the filter 100.

To replace the filter in an existing installation the following would occur. Initially, the top ring which is typically bolted down onto the bottom ring would be removed by removing the bolts. The existing filter would then be removed. The filter support would be supported by the lower ring. Filter 100 can now be either first secured to upper ring 102 or placed on the filter support with ring 102 placed thereon and secured. To secure filter 100 to ring 102 merely involves placing the ring 102 thereon and overlapping the outer edge 104 with the drawstring 106 on the top of ring 102 as shown in FIG. 5. The drawstring 106 is then drawn in or tightened and tied off securing the filter thereto. As part of the installation, skirt 116 is positioned within the reject opening 18. The strainer may now be operated since the filter 100 has been evenly tensioned and rest on the filter support which is supported by lower ring. The upper ring need not be bolted down onto the lower ring and serves to maintain the filter 100 in the proper position. Since the spray of fluid is downward, there is no upward force thereon so the upper ring 102 is sufficient to maintain it in place. Subsequent replacement (or new installation) may be readily achieved without disassembling the strainer as heretofore discussed.

Thus by the present invention its objects and advantages are realized and although a preferred embodiment has been disclosed and described in detail herein, its scope should not be limited thereby rather its scope should be determined by that of the appended claims.

What is claimed is:

1. A strainer for filtering solids from liquids having a screen assembly comprising a filter support for supporting a filter comprising a cylindrical member having an axial opening therein; means of supporting said assembly in the strainer; said filter being made of a somewhat flexible material and being circular in shape having a perimeter and having an axial opening therein which aligns with the axial opening in the filter support; a support ring positioned about the perimeter of said filter and tensioning means for securing said filter to said ring which includes folding said perimeter about said ring and applying radial tension on said perimeter such that the filter is maintained thereabout with the ring secured within said filter, and said filter and said ring being supported by said filter support.

2. The strainer in accordance with claim 1 wherein said tensioning means includes a drawstring positioned about said perimeter which upon drawing in results in radial tension on said perimeter.

3. The strainer in accordance with claim 2 wherein said perimeter is darted with a plurality of v-shaped notches.

4. The strainer in accordance with claim 1 wherein said axial opening of the filter includes a downwardly depending cylindrical skirt.

5. The strainer in accordance with claim 4 wherein about said axial opening of the filter is a circular rigid member.

* * * * *